United States Patent
Xu et al.

(10) Patent No.: US 11,640,743 B2
(45) Date of Patent: May 2, 2023

(54) CABINET AND VENDING MACHINE

(71) Applicants: Weihai New Beiyang Digital Technology Co., Ltd., Shandong (CN); Shandong New Beiyang Information Technology Co., Ltd., Shandong (CN)

(72) Inventors: Fengbo Xu, Shandong (CN); Tianxin Jiang, Shandong (CN)

(73) Assignee: Weihai New Beiyang Digital Technology Co., Ltd., Shandong (CN)

( * ) Notice: Subject to any disclaimer, the term of this patent is extended or adjusted under 35 U.S.C. 154(b) by 72 days.

(21) Appl. No.: 17/264,396

(22) PCT Filed: Jul. 30, 2019

(86) PCT No.: PCT/CN2019/098417
§ 371 (c)(1),
(2) Date: Jan. 29, 2021

(87) PCT Pub. No.: WO2020/024942
PCT Pub. Date: Feb. 6, 2020

(65) Prior Publication Data
US 2021/0312751 A1 Oct. 7, 2021

(30) Foreign Application Priority Data
Aug. 3, 2018 (CN) .......................... 201810883120.9

(51) Int. Cl.
*G07F 11/24* (2006.01)
*G06Q 20/18* (2012.01)

(52) U.S. Cl.
CPC ............. *G07F 11/24* (2013.01); *G06Q 20/18* (2013.01)

(58) Field of Classification Search
CPC ......... G06Q 20/18; G06F 11/24; B65G 59/00; G07F 11/60
(Continued)

(56) References Cited

U.S. PATENT DOCUMENTS 4,762,250 A * 8/1988 Friberg ............... G07F 17/0078
221/133
6,682,289 B1 * 1/2004 Credle, Jr. ............ G07F 11/163
221/95
(Continued)

FOREIGN PATENT DOCUMENTS

CA 2428556 A1 * 11/2003 .............. G07F 11/44
CN 102637322 A 8/2012
(Continued)

OTHER PUBLICATIONS

International Search Report and Written Opinion issued in related International Application Serial No. PCT/CN2019/098417 dated Nov. 5, 2019, 8 pages.
(Continued)

*Primary Examiner* — Rakesh Kumar
(74) *Attorney, Agent, or Firm* — Mark H. Whittenberger; Holland & Knight LLP (57) ABSTRACT

Disclosed are a bucket and a vending machine. The bucket is used for the vending machine and includes a shell, a turnover body and a first driving mechanism. The shell has a base plate and the turnover body is provided with a storage cavity, an inlet and an outlet. Both the inlet and the outlet are connected with the storage cavity. The turnover body may be located in a first position and a second position. When the turnover body is located in the first position, the base plate closes the outlet; when the turnover body is located in the second position, the outlet deviates from the base plate and is opened. The first driving mechanism is in transmission connection with the turnover body and is configured to drive the turnover body to switch between the first position and the second position.

17 Claims, 8 Drawing Sheets

(58) Field of Classification Search
USPC ......... 221/133, 123, 129, 124, 130; 212/258
See application file for complete search history.

(56) References Cited

U.S. PATENT DOCUMENTS

| | | | | |
|---|---|---|---|---|
| 6,755,322 | B1* | 6/2004 | Herzog | G07F 11/58 221/133 |
| 6,808,082 | B2* | 10/2004 | Ohkubo | G07F 11/58 221/133 |
| 8,469,230 | B2* | 6/2013 | Perkins | G07F 11/1653 221/196 |
| 10,431,034 | B2* | 10/2019 | Fan | G07F 11/60 |
| 2001/0048000 | A1* | 12/2001 | Arai | G07F 11/62 221/133 |
| 2003/0075552 | A1* | 4/2003 | Ohkubo | G07F 11/58 221/131 |
| 2003/0201275 | A1* | 10/2003 | Tamura | G07F 11/1653 221/123 |
| 2005/0189364 | A1* | 9/2005 | Herzog | G07F 11/1653 221/1 |
| 2006/0261080 | A1* | 11/2006 | Matsumoto | G07F 11/58 221/124 |
| 2008/0290108 | A1* | 11/2008 | Tsunoda | G07F 11/163 221/133 |
| 2010/0243666 | A1* | 9/2010 | Skavnak | G07F 11/165 221/1 |
| 2011/0226795 | A1* | 9/2011 | Sichich | G07F 11/165 221/133 |
| 2021/0312751 | A1* | 10/2021 | Xu | G07F 11/42 |

FOREIGN PATENT DOCUMENTS

| | | | | |
|---|---|---|---|---|
| CN | 202512662 | U | 10/2012 | |
| CN | 103098103 | A * | 5/2013 | ............ G07F 11/165 |
| CN | 104792081 | A | 7/2015 | |
| CN | 106327679 | A * | 1/2017 | ............. G07F 11/00 |
| CN | 206179093 | U | 5/2017 | |
| CN | 206179093 | U * | 5/2017 | ............. G07F 11/00 |
| CN | 207182494 | U * | 4/2018 | ............. G07F 11/00 |
| CN | 207182494 | U | 4/2018 | |
| CN | 207895577 | U | 9/2018 | |
| CN | 208636926 | U | 3/2019 | |
| CN | 209015289 | U | 6/2019 | |
| CN | 109993905 | A * | 7/2019 | ............. G07F 11/16 |
| CN | 113763628 | A * | 12/2021 | ............. G07F 11/00 |
| JP | 2000113307 | A | 4/2000 | |
| JP | 2000113307 | A * | 4/2000 | ............. G07F 11/16 |
| JP | 2005196421 | A * | 4/2000 | ............. G07F 11/02 |
| JP | 2003085634 | A * | 3/2003 | ............. G07F 11/00 |
| JP | 2003085634 | A | 3/2003 | |
| JP | 2005196421 | A | 7/2005 | |
| JP | 2005196421 | A * | 7/2005 | ............. G07F 11/58 |
| WO | 2004036516 | A1 | 4/2004 | |
| WO | WO-2009138864 | A1 * | 11/2009 | ............ G07F 11/165 |
| WO | WO-2019056768 | A1 * | 3/2019 | ............. G07F 11/00 |
| WO | WO-2019128336 | A1 * | 7/2019 | ............. G07F 11/02 |

OTHER PUBLICATIONS

First Chinese Office Action issued in related International Chinese Patent Application No. 201810883120.9 dated Aug. 5, 2020, 12 pages.

* cited by examiner

CABINET AND VENDING MACHINE

RELATED APPLICATIONS

The subject application is a U.S. National Stage application of International Application No. PCT/CN2019/098417, filed on 30 Jul. 2019, which claims the priority of Chinese Patent Application No. 201810883120.9 on 3 Aug. 2018, the contents of which are herein incorporated by reference in their entirety.

TECHNICAL FIELD

This application relates to the technical field of automatic vending, such as a bucket and a vending machine.

BACKGROUND

In recent years, with the availability of various groceries, fruits and vegetables, drinks and other items on vending machines, the scope of application of vending machines is increasingly wide.

A vending machine is provided in the related technology. The pushing mechanism of the vending machine pushes an item in the storage column into the bucket, which is driven by the delivery mechanism to reach the pickup port, and a user may directly pick up the item from the bucket through the pickup port. This structure does not facilitate the sealing of the internal and external environments of the vending machine, especially this structure does not conducive to the isolation of the internal and external environment of the vending machine with cooling or heating function and will increase the energy consumption of the whole vending machine.

SUMMARY

This application provides a bucket, which is capable of selectively cutting off or opening the connection between the outlet and the outside, which improve the safety of the item in the bucket and improve the sealing of the internal and external environments of the bucket.

The application further provides a vending machine including the above-mentioned bucket. Therefore, the vending machine has a high safety performance, and the internal and external environments are isolated, and the energy consumption is low.

The embodiment of the application is realized as follows: a bucket, including:
a shell, which is provided with a base plate;
a turnover body moveably arranged in the shell, is provided with a storage cavity, an inlet and an outlet, both of the inlet and the outlet are connected with the storage cavity, and the turnover body may be located in a first position and a second position, when the turnover body is located in the first position, the base plate closes the outlet, and when the turnover body is located in the second position, the outlet deviates from the base plate and the outlet is opened;
a first driving mechanism in transmission connection with the turnover body, is configured to drive the turnover body to switch between the first position and the second position.

A vending machine, including a cabinet, a storage device set in the cabinet and the bucket, which the surface of the cabinet is provided with a pickup port, the storage device includes a storage column, and the bucket is configured to deliver items between the storage column and the pickup port.

BRIEF DESCRIPTION OF DRAWINGS

Brief introduction is provided in the following for the drawings necessary in embodiment description. It should be understood that drawings below illustrate only some embodiments of this paper, and, therefore, should not be construed as a limitation of scope, and other related drawings may be acquired based on the said drawings by general technicians in the field without making any creative effort.

In the figure: 100—vending machine; 101—cabinet body; 102—cabinet; 103—cabinet door; 105—storage device; 107—bucket; 111—shelf; 113—divider plate; 117—item outlet; 119—dispensing mechanism; 123—third driving mechanism; 125—second gear; 127—third transmission assembly; 129—belt wheel; 131—first driving belt; 203—first motor; 135—fourth transmission assembly; 137— swing arm; 139—mandrel; 141—third gear; 143—driven belt wheel; 145—spring; 147—groove; 149—distance measuring element; 151—distance measuring part; 153—plug-in; 155—fixed part; 157—opening; 159—code scanning element; 161—storage column sign; 165—delivery mechanism; 167—first driving mechanism; 169—second driving mechanism; 171—turnover body; 173—first detecting member; 175—second detecting member; 177—third detecting member; 179—camera; 181—human-machine interaction device; 183—glass window; 185—elastic hook; 187—insertion post; 189—long slot; 193—storage column; 195—second driving belt; 197—push plate; 199—support frame; 201—rotating shaft; 133—second motor; 205—locating plate; 207—conveyor belt; 209—shell; 211—inlet; 213—arc rack; 214—first gear; 216—second transmission assembly; 221—elastic element; 223—outlet; 300—base plate; 301—fourth gear; 303—bucket driving device; 310—connecting plate; 320—side plate; 400—dispensing device; 403—housing; 405—inner opening; 407—pickup port; 409—entrance gate; 413—gate rotating shaft; 437—fixed frame; 455—elastic piece; 457—driving belt wheel.

DETAILED DESCRIPTION

The solutions in the embodiments of this paper will be clearly and completely described as follows by combining with the drawings herein. Obviously, the embodiments are only some of rather than all of the embodiments of this paper. The components of the embodiments of this paper, which are generally described and illustrated in the drawings herein, may be arranged and designed in various different configurations. Therefore, the following detailed descriptions of embodiments of this paper in the drawings are not intended to limit the scope of the claimed paper, but only represent selected embodiments of the paper. Other embodiments based on this paper as acquired by general technicians in the field without making any creative effort also belong to the protection scope of this paper.

Note that similar numbers and letters refer to similar items in the following drawings. Therefore, once an item is defined in one drawing, the item will not be further defined or explained in the subsequent drawings.

It needs to be noted in the descriptions of embodiments of the paper that the terms "central", "upper", "lower", "left", "right", "vertical", "horizontal", "inside" and "outside" and the like indicate an orientation or positional relationship based on those shown in the drawings or on how the paper product is normally placed, and are used only for facilitating the description of the paper and for simplified description, not for indicating or implying that the target devices or components must have a special direction and be structured and operated at the special direction, thereby they cannot be understood as the restrictions to the paper. Moreover, the words "first", "second" and "third" are only used for distinguishing descriptions, and cannot be understood as indicating or implying relative importance.

It needs to be noted in the descriptions of embodiments of the paper that unless otherwise specified or restricted, the terms "setting", "installation", "interconnection" and "connection" shall be understood as a general sense. For example, the connection may be fixed connection, removable connection, integrated connection, mechanical connection, electrical connection, direct connection, indirect connection through intermediate media or connection between two components. Persons of ordinary skill in the art can understand the specific meanings of the terms above in the paper as the case may be.

In the application, unless otherwise explicitly specified and restricted, "a first feature above or below a second feature" may include "direct contact between the first feature and the second feature", and may also include that "the first feature and the second feature are not in direct contact but they are in contact through other feature(s) between them". Furthermore, "the first feature is above and at the upper part of the second feature" includes "the first feature is directly above and obliquely above the second feature", or simply indicates that "the first feature is higher in level than the second feature". "The first feature is below and at the lower part of the second feature" includes "the first feature is directly below and obliquely below the second feature", or simply indicates that "the first feature is smaller in level than the second feature".

Figure 1:
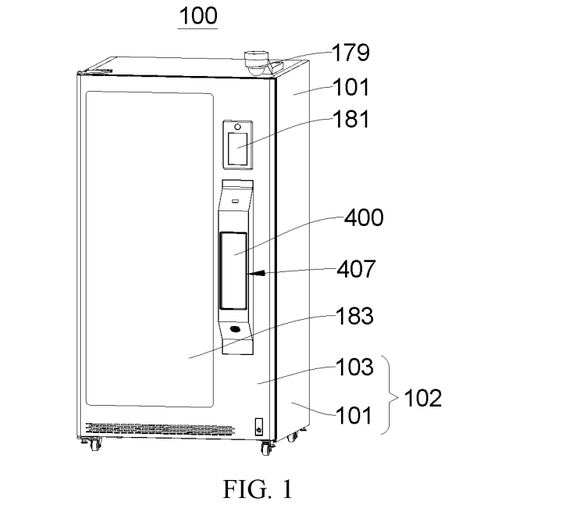
FIG. 1 is a structural view of a vending machine in a door-closed state according to an embodiment of the application.
Figure 2:
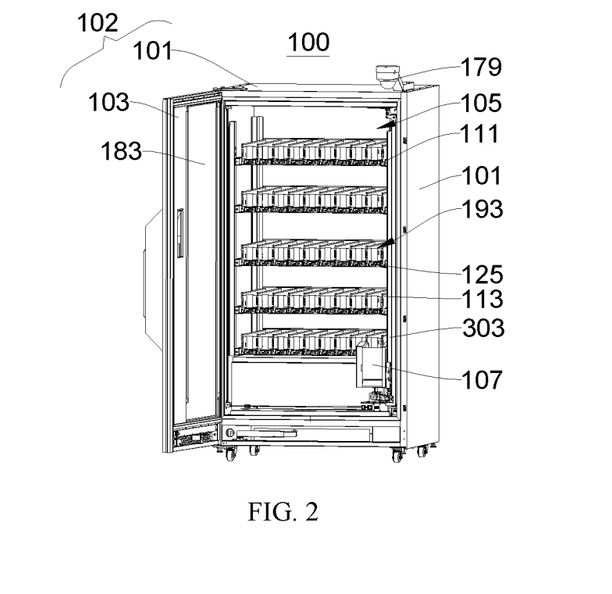
FIG. 2 is a structural view of a vending machine in a door-opened state according to an embodiment of the application.

FIG. 1 is a structural view of a vending machine 100 according to an embodiment of the application; FIG. 2 is a structural view of a vending machine 100 in a door-opened state according to an embodiment of the application. The vending machine 100 in this embodiment includes a cabinet 102, a storage device 105 and a bucket 107 arranged in the cabinet 102. The surface of the cabinet 102 is provided with a pickup port 407. The storage device 105 includes a plurality of storage columns 193 for storing item, and the bucket 107 is configured to deliver items between any one of the storage columns 193 and the pickup port 407.

In some embodiments, the cabinet 102 includes a cabinet body 101 and a cabinet door 103, the cabinet body 101 has an opening and the cabinet door 103 is used for opening or closing the opening; the storage device 105 is arranged in the cabinet body 101 and has a plurality of storage columns 193 for storing items; the storage columns 193 have an item outlet 117 for dispensing item; and the bucket 107 is arranged between the cabinet door 103 and the storage device 105.

Specifically, please refer to FIG. 1 and FIG. 2 again. In this embodiment, the cabinet door 103 is rotatably connected with the cabinet body 101. The pickup port 407 is set on the cabinet door 103, and a gate can further be set at the pickup port 407 to open or close the pickup port 407, and therefore to ensure the safety of items in the vending machine 100. The material for the cabinet door 103 may be a transparent material, or a transparent glass window 183, so as to show the items in the cabinet body 101. The cabinet door 103 may be set with a human-machine interaction device 181, such as a keyboard, a touch screen, etc. Through the human-machine interaction device 181, a user may select the type and quantity of item.

Optionally, in this embodiment, the vending machine 100 may further be set with a camera 179. And the camera 179 is used for monitoring the external environment of the vending machine 100, thus improving the safety performance of the vending machine 100.

Figure 3:
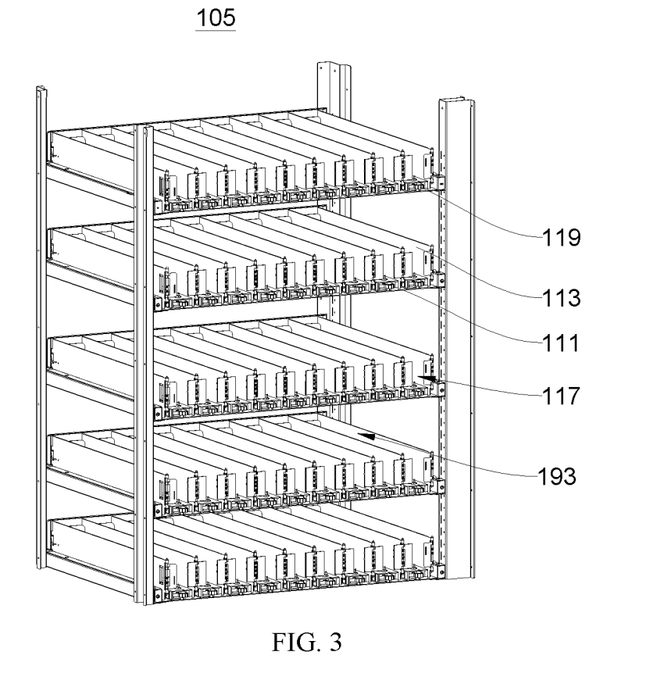
FIG. 3 is a structural view of a storage device of a vending machine according to an embodiment of the application.

FIG. 3 is a structural view for a bucket of the vending machine 100 of the storage device 105 according to the embodiment. Please refer to FIG. 1 to FIG. 3. In this embodiment, the storage device 105 includes a plurality of shelves 111 arranged at intervals in the vertical direction, and a plurality of divider plates 113 are arranged on each shelf 111 along the left-right direction, and adjacent divider plates 113 and corresponding shelf 111 together form a storage column 193. The storage column 193 is used for storing items, and a plurality of items can be stored in one storage column 193. The storage column 193 has an item outlet 117 located at one end of the storage column 193 along the length direction, and a plurality of items are sequentially arranged along the length direction of the storage column 193. A dispensing mechanism 119 is arranged in each storage column 193, and the dispensing mechanism 119 is configured to drive the items to move along the direction of item dispensing until they are dispensed from the item outlet 117, where the direction of item dispensing is the length direction of the storage column 193.

In some embodiments, the bucket 107 is arranged between the cabinet door 103 and the storage device 105. The bucket 107 is capable of moving between the pickup port 407 and any one of the storage columns 193. When the bucket 107 is opposite to the item outlet 117 of the storage column 193 with incoming item, the bucket 107 is capable of receiving item from the storage column 193. When the bucket 107 is opposite to the pickup port 407, the bucket 107 is capable of delivering the item to the pickup port 407, for easy pick-up by a user.

Figure 4:
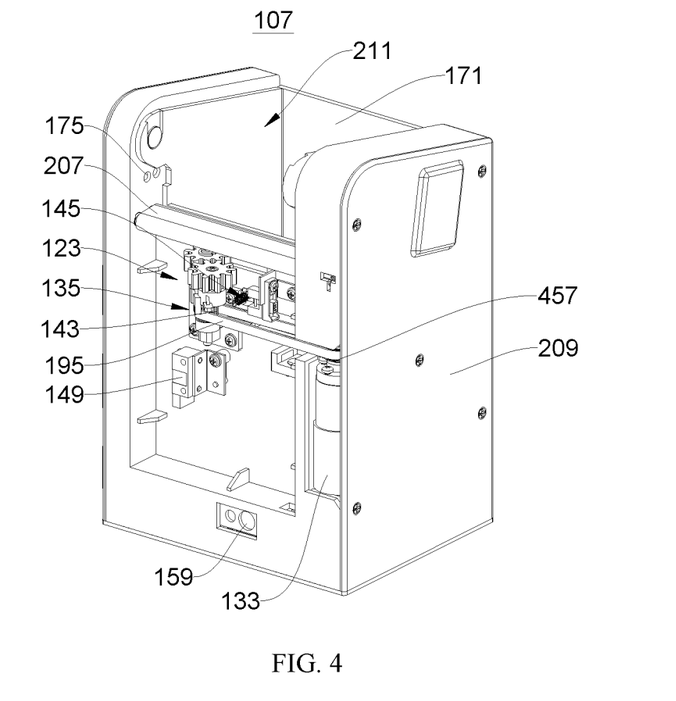
FIG. 4 is a structural view of the bucket according to an embodiment of the present disclosure.
Figure 5:
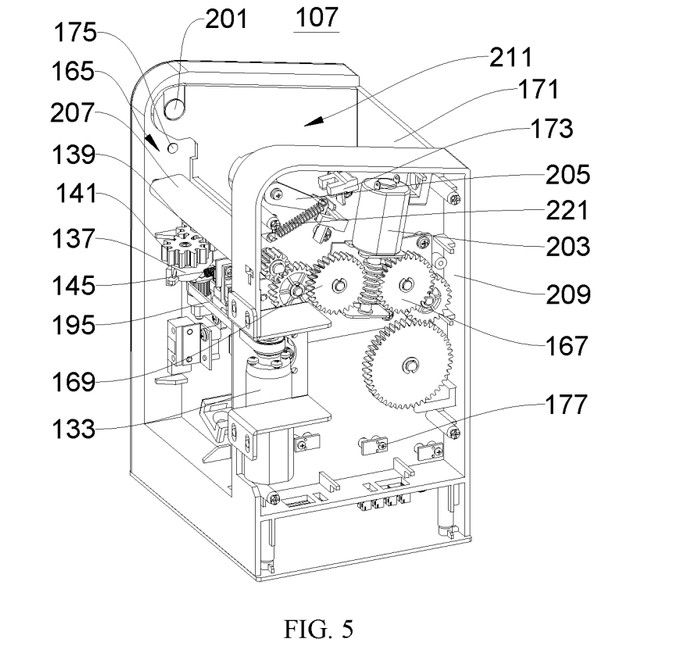
FIG. 5 is a local structural view of a bucket according to an embodiment of the application from a first angle of view, where the turnover body is at a first position.
Figure 6:
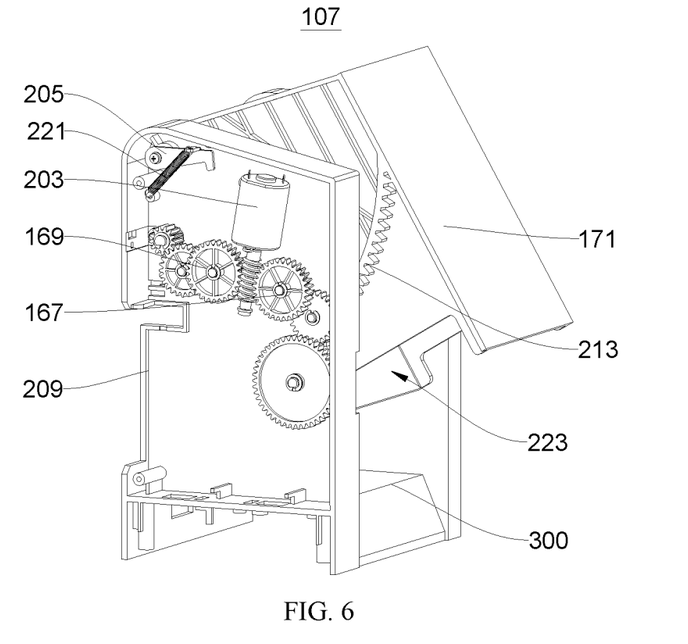
FIG. 6 is a local structural view of a bucket according to an embodiment of the application from a second angle of view, where a turnover body is at a second position.
Figure 7:
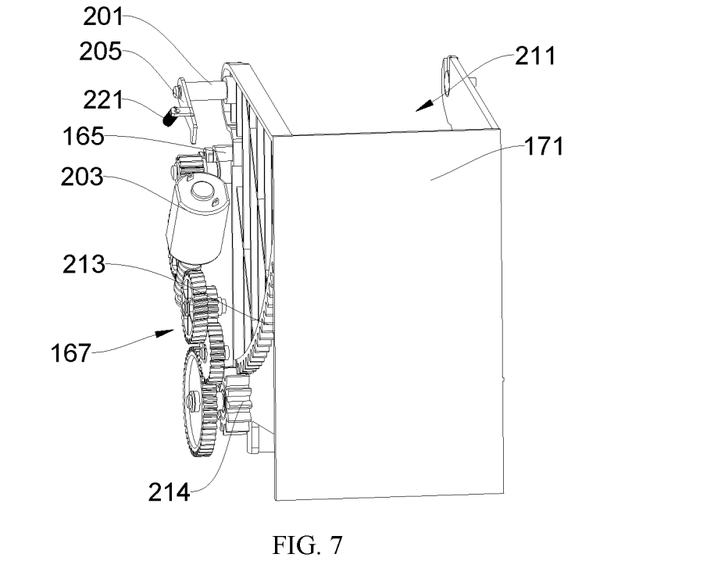
FIG. 7 is a local structural view of a bucket according to an embodiment of the application from a third angle of view.
Figure 8:
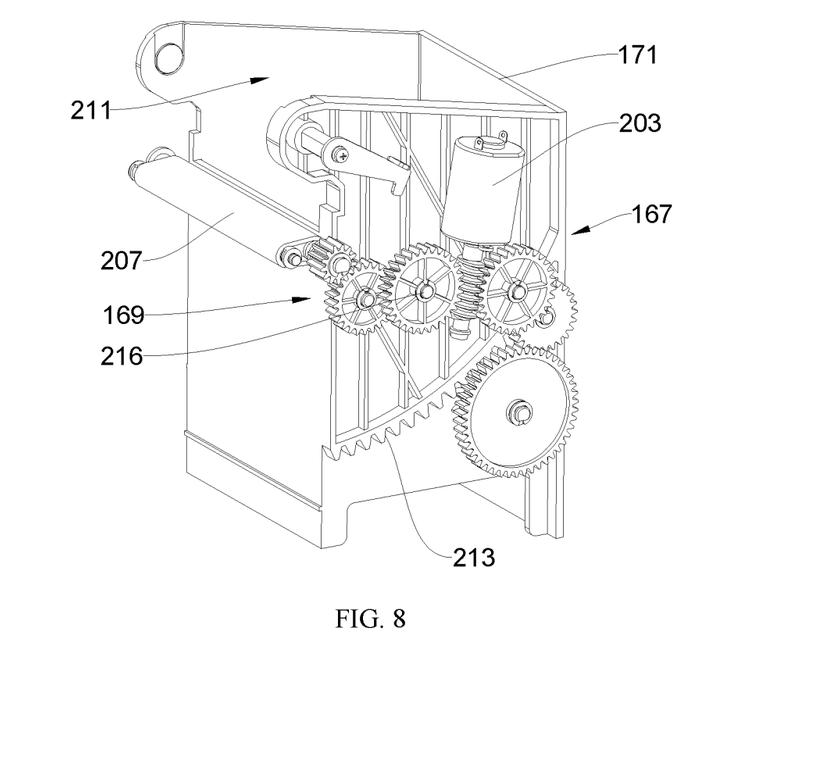
FIG. 8 is a local structural view of the bucket from a fourth angle of view according to an embodiment of the present disclosure.

FIG. 4 is a structural view of a bucket 107 according to the embodiment; FIG. 5 is a local structural view of a bucket 107 according to the embodiment from a first angle of view, where a turnover body 171 is at a first location; FIG. 6 is a local structural view of a bucket 107 according to the embodiment from a second angle of view, where a turnover body 171 is at a second location; FIG. 7 is a local structural view of a bucket 107 according to the embodiment from a third angle of view; FIG. 8 is a local structural view of a bucket 107 according to the embodiment from a fourth angle of view; please refer to FIG. 4 to FIG. 8. The bucket 107 according to this embodiment includes a shell 209, a turnover body 171 and a first driving mechanism 167.

Specifically, please refer to FIG. 4 to FIG. 8 again. In this embodiment, a shell 209 includes a base plate 300 for supporting item, and further includes a connecting plate 310 and two side plates 320, the two side plates 320 are arranged at intervals, the bottoms of the two side plates 320 are vertically connected with the base plate 300, and the connecting plate 310 is simultaneously connected with the two side plates 320 and the base plate 300. The turnover body 171 is movably arranged in the shell 209 between the two side plates 320 and above the base plate 300. The turnover body 171 has a storage cavity for storing items, an inlet 211 for receiving items and an outlet 223 for discharging items. Both the inlet 211 and the outlet 223 are connected to the storage cavity, and the turnover body 171 may be located at a first position and at a second position. When the turnover body 171 is located at the first position, the base plate 300 closes the outlet 223, at which time, if the items enter the storage cavity through the inlet 211, they will fall on the base plate 300; and when the turnover body 171 is located at the second position, the outlet 223 deviates from the base plate 300, the outlet 223 is opened, and the items in the storage cavity will be dispensed from the outlet 223 by its own weight. The turnover body 171 makes the outlet 223 of the bucket 107 may be disconnected or connected with the outside optionally, so that the items can be smoothly delivered out when the bucket 107 delivers item, and when the bucket 107 does not deliver item, the internal and external environments of the bucket 107 are isolated, thereby improving the safety of the bucket 107 and Optionally, in this embodiment, the turnover body 171 is a tubular structure with openings set at both the top and the bottom respectively. The upper opening of the tubular structure is the inlet 211, and the lower opening is the outlet 223. When the turnover body 171 is at the first position, the base plate 300 closes the outlet 223, thus ensuring the isolation between the internal and external environments of the vending machine 100 and reducing the energy consumption. When the turnover body 171 is located at the second position, the outlet 223 deviates from the base plate 300, and the outlet 223 is opened, thereby ensuring the smooth dispensing of the items in the storage cavity.

Please refer to FIG. 4 to FIG. 8 again, and in this embodiment, the turnover body 171 is rotatably connected with the two side plates 320 of the shell 209 through a rotating shaft 201, and the first driving mechanism 167 includes a first motor 203 and a first transmission assembly. The first motor 203 is set at the shell 209, and the first transmission assembly is connected with the first motor 203 and the turnover body 171 in a transmission way. In some embodiments, the first motor 203 is configured to drive the turnover body 171 through the first transmission assembly to rotate between the first position and the second position.

In some embodiments, the first transmission assembly includes an arc rack 213 and a first gear 214 matched with the arc rack 213. The arc rack 213 is set on a side wall of the turnover body 171 and concentric with the rotating shaft 201 of the turnover body 171. The first gear 214 is in mesh connection with the arc rack 213. The first gear 214 is also in transmission connection with the first motor 203. When an output shaft of the first motor 203 rotates, the first gear 214 is driven to rotate, and the turnover body 171 is driven to rotate between the first position and the second position through the cooperation between the arc rack 213 and the first gear 214.

Optionally, in this embodiment, the output shaft of the first motor 203 has a first rotation direction and a second rotation direction, and the first transmission assembly includes a first one-way member configured to transmit power to the turnover body 171 only when the first motor 203 rotates in the first rotation direction, driving the turnover body 171 to rotate from the first position to the second position.

In some embodiments, the first one-way member is a first one-way bearing arranged in the transmission chain from the output shaft of the first motor 203 to the first gear 214. For example, the first gear 214 is sleeved on the first one-way bearing which is sleeved on the output shaft of the first motor 203. When the output shaft of the first motor 203 rotates in the first rotation direction, the first one-way bearing holds tight the output shaft of the first motor 203, and drives the first gear 214 to rotate. The first gear 214 drives the arc rack 213, making the turnover body 171 to rotate around the rotating shaft 201, thus driving the turnover body 171 to rotate from the first position to the second position. When the output shaft of the first motor 203 rotate along the second rotation direction which is opposite to the first rotation direction, the first one-way bearing slips with the output shaft of the first motor 203, and the output shaft of the first motor 203 cannot drive the first one-way bearing to rotate, i.e., it cannot drive the rotation of the first gear 214. The turnover body 171 is at the first location by its own weight to ensure the isolation of the internal and the external environments of the outlet 223, thus improving the safety of the bucket 107.

It should be noted that in other embodiments provided herein, the first one-way member may also be a ratchet and pawl structure. When the output shaft of the first motor 203 rotates in the first rotation direction, the ratchet engages with the pawl to drive the first gear 214 to rotate, thereby driving the turnover body 171 to rotate from the first position to the second position. When the output shaft of the first motor 203 rotates in the second rotation direction, the ratchet separates from the pawl, and the first gear 214 cannot be driven to rotate, and the turnover body 171 is kept at the first position under the action of its own weight.

It should be noted that in this embodiment, the first transmission assembly includes an arc rack 213 and the first gear 214 which are in mesh connection, and may further include other transmission parts for transmitting the power output by the first motor 203 to the first gear 214. For example, it may also include a worm gear and worm assembly and a transition gear, the worm is fixedly sleeved on the output shaft of the first motor 203, and the worm gear engages with the worm, and the transition gear simultaneously engages with the worm gear and the first gear 214.

It should be noted that in other embodiments provided herein, the first transmission assembly may include the first gear 214 and a transmission gear in mesh connection, the first gear 214 is in transmission connection with the output shaft of the first motor 203, and the transmission gear is fixedly sleeved on the rotating shaft 201 of the turnover body 171. When the first motor 203 drives the first gear 214 to rotate, the first gear 214 drives the transmission gear to rotate, and the transmission gear drives the turnover body 171 through the rotating shaft 201 to rotate between the first position and the second position.

Please refer to FIG. 4 to FIG. 8 again, and in this embodiment, the bucket 107 further includes a delivery mechanism 165 and a second driving mechanism 169. The delivery mechanism 165 is mainly used for delivering items into the bucket 107. The delivery mechanism 165 is set at one end of the shell 209 near the inlet 211, and the delivery mechanism 165 includes a delivery roller which is in transmission connection with the second driving mechanism 169. With the driving of the second driving mechanism 169, the delivery roller rotates, so that the items on the delivery roller may be driven to enter the storage cavity of the turnover body 171 through the inlet 211.

In some embodiments, the second driving mechanism 169 may include a motor, which is in transmission connection with the delivery roller. The motor is configured to drive the delivery roller to rotate, thereby driving the items to enter the storage cavity of the turnover body 171 through the inlet 211. By setting the delivery roller at the inlet 211, the driving force of item movement is increased, therefore facilitating the entering of the items into the storage cavity of the turnover body 171 more smoothly.

Optionally, in this embodiment, the delivery mechanism 165 further includes a driven roller and a conveyor belt 207, the delivery roller and the driven roller are arranged with intervals along the direction that the items will enter the inlet 211. The conveyor belt 207 is supported by the delivery roller and the driven roller. When the second driving mechanism 169 drives the delivery roller to rotate, the delivery roller drives the conveyor belt 207 to move, and the conveyor belt 207 drives the items thereon to enter the storage cavity of the turnover body 171 through the inlet 211. In this embodiment, the items are delivered into the turnover body 171 by the conveyor belt 207, thus increasing the contact area of the delivery mechanism 165 with the items, and increasing the driving force for the movement thereof and making the items to enter the storage cavity of the turnover body 171 more smoothly.

In some embodiments, and in this embodiment, the second driving mechanism 169 includes a second transmission assembly 216 which is in transmission connection both with the first motor 203 and the delivery roller. The second driving mechanism 169 is configured to transmit the force of the first motor 203 to the delivery roller, so that the delivery roller will drive the items into the inlet 211. In this embodiment, one first motor 203 is used to simultaneously drive the delivery roller and the turnover body 171, so that the structure is simple and the cost is reduced.

In some embodiments, the second transmission assembly 216 may further include a second one-way member. The output shaft of the first motor 203 has the first rotation direction and the second rotation direction. The second one-way member is configured to transmit power to the delivery roller only when the first motor 203 rotates in the second rotation direction, so as to drive the delivery roller to rotate and deliver items into the inlet 211. It should be noted that the first transmission assembly and the second transmission assembly 216 may include a one-way member at the same time, or either one of them may include a one-way member. When the two transmission assemblies only include one one-way member, and when the output shaft of the first motor 203 rotates in the first rotation direction, the first transmission assembly drives the turnover body 171 to rotate from the first position to the second position. At this time, the transmission between the first motor 203 and the delivery roller is disconnected, and therefore the delivery roller will not be driven to rotate. When the output shaft of the first motor 203 rotates in the second rotation direction, the transmission between the first motor 203 and the turnover body 171 is disconnected, and the first motor 203 is in transmission connection with the delivery roller to drive the delivery roller to rotate, while the turnover body 171 is at the first position under the action of its own weight. At this time, the base plate 300 blocks the outlet 223 of the turnover body 171, so the base plate 300 is capable of receiving the items sent by the delivery roller through the inlet 211.

In some embodiments, the second one-way member is a second one-way bearing. When the first motor 203 rotates in the first rotation direction, the first motor 203 is configured to drive the first gear 214 to drive the turnover body 171 to rotate to the second position. When the first motor 203 rotates in the second rotation direction, the first motor 203 is configured to drive the second transmission assembly 216 to drive the delivery roller to rotate, and to deliver the item into the bucket 107. The first motor 203 can be used to drive the turnover body 171 and the delivery roller respectively, thereby reducing the number of motors and reducing the cost.

Please refer to FIG. 4 to FIG. 8 again, and in this embodiment, a locating plate 205 is fixedly sleeved on the rotating shaft 201. When the first driving mechanism 167 drives the turnover body 171 to switch between the first position and the second position, the locating plate 205 rotates with the rotating shaft 201. The shell 209 is provided with a first detecting member 173 for detecting the position of the locating plate 205. For example, when the turnover body 171 is at the first position, the locating plate 205 is separated from the first detecting member 173, and the first detecting member 173 outputs a first signal; when the turnover body 171 is at the second position, the locating plate 205 cooperate with the first detecting member 173, and the first detecting member 173 outputs a second signal. According to the signal output by the first detecting member 173, the position of the turnover body 171 can be determined. By detecting the position of the locating plate 205, the first detecting member 173 realizes the detecting of the position of the turnover body 171, thus by detecting of the position of the turnover body 171, it is ensured that the turnover body 171 is at the first location during input, and at the second position during dispensing item, so that the bucket 107 provided herein is capable of realizing the delivery of items smoothly.

Optionally, in this embodiment, the first driving mechanism 167 further includes an elastic element 221. The elastic element 221 is configured to make the turnover body 171 to have a trend to rotate toward the first position, so that the turnover body 171 has a trend to block the outlet 223. Therefore, when the turnover body 171 is at the first position, the turnover body 171 is stable at the first position by the elastic force of the elastic element 221, even if the items enter the storage cavity of the turnover body 171, the impact on the turnover body 171 cause the turnover body to deviate from the first position, the turnover body 171 will still reset and keep at the first position by the force of the elastic element 221, thus further ensuring the isolation of the internal and external environments of the vending machine 100, reducing the energy consumption and improving the safety of the vending machine 100. In this embodiment, one end of the elastic element 221 is connected to the locating plate 205, and the other end is connected to the shell 209. Under the action of elastic force from the elastic element 221, the locating plate 205 has a movement trend to drive the turnover body 171 to rotate to the first position through the rotating shaft 201, the turnover body 171 has a moving trend to rotate to the first position.

Please refer to FIG. 4 to FIG. 8 again, and optionally, in this embodiment, a second detecting member 175 is further provided at the position of the shell 209 near the inlet 211, and the second detecting member 175 is used to detect whether the item enter the inlet 211. A third detecting member 177 is further provided on the side wall of the shell 209, and the third detecting member 177 is located adjacent to the base plate 300. A notch is set at the bottom of the turnover body 171. The third detecting member 177 passes through an opening on the side wall of the shell 209, and the notch at the bottom of the turnover body 171 and opposites to the storage cavity of the turnover body 171. The third detecting member 177 is used to detect whether there is an item in the storage cavity of the turnover body 171.

It should be noted that each of the first detecting member 173, the second detecting member 175 and the third detecting member 177 may be one of such sensors as a photoelectric sensor, a mechanical sensor and an ultrasonic sensor.

Figure 9:
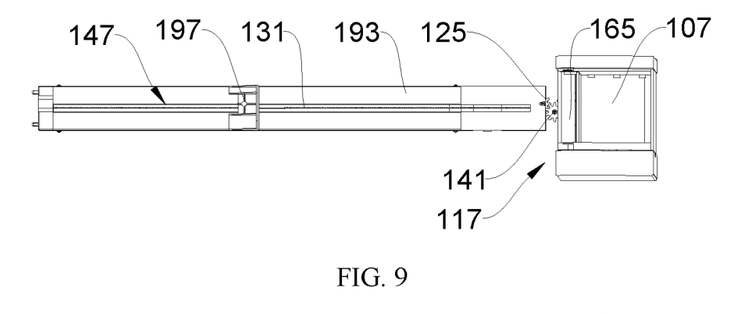
FIG. 9 is a structural view of a dispensing mechanism cooperating with a bucket of a vending machine according to an embodiment of the application.
Figure 10:
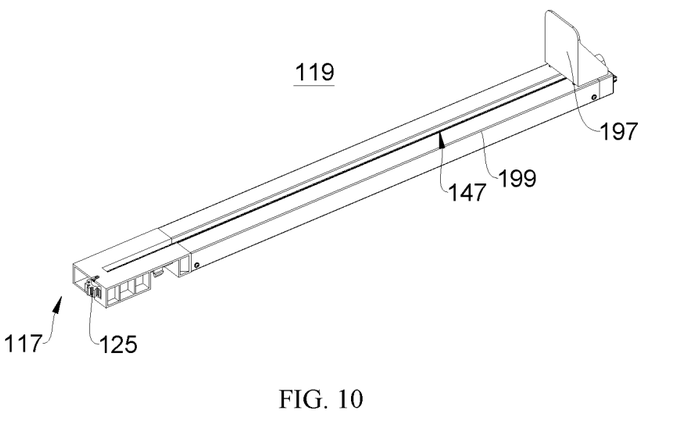
FIG. 10 is a structural view of a dispensing mechanism of a vending machine according to an embodiment of the application from a fifth angle of view.
Figure 11:
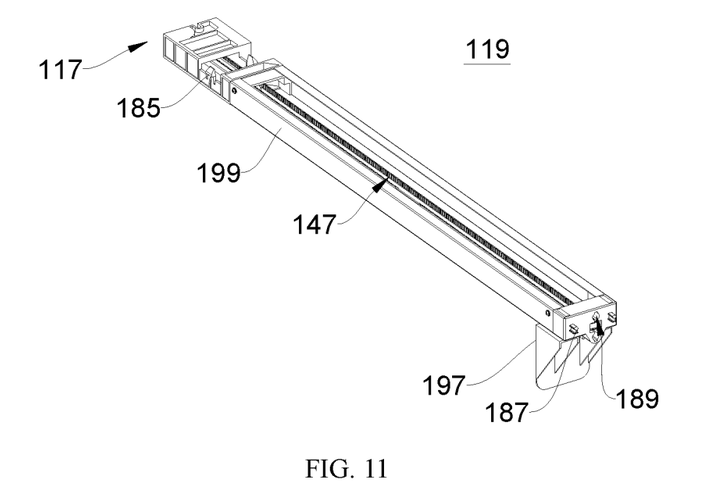
FIG. 11 is a structural view of a dispensing mechanism of a vending machine according to an embodiment of the application from a sixth angle of view.
Figure 12:
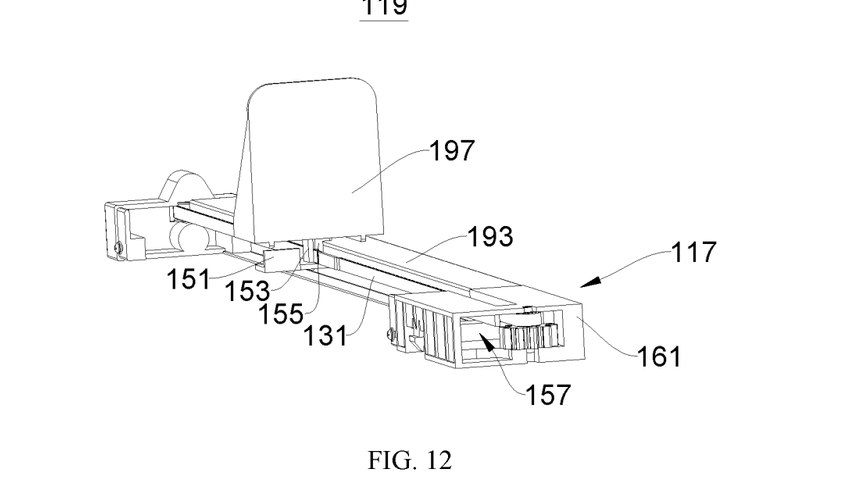
FIG. 12 is a local structural view of a dispensing mechanism of a vending machine according to an embodiment of the application from a seventh angle of view.
Figure 13:
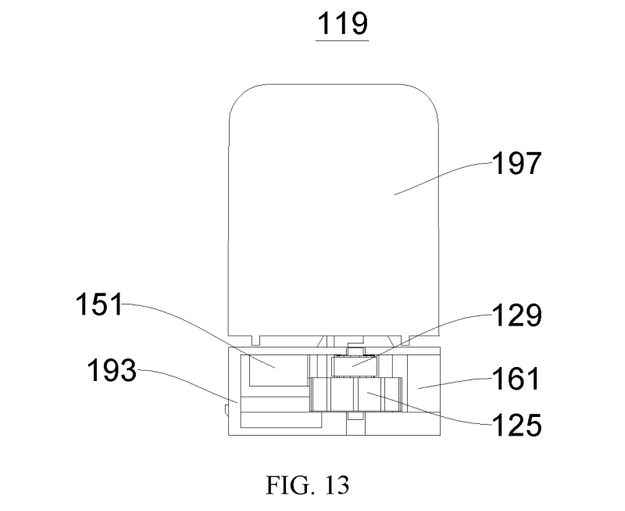
FIG. 13 is a local structural view of a dispensing mechanism of a vending machine according to an embodiment of the application from an eighth angle of view.
Figure 14:
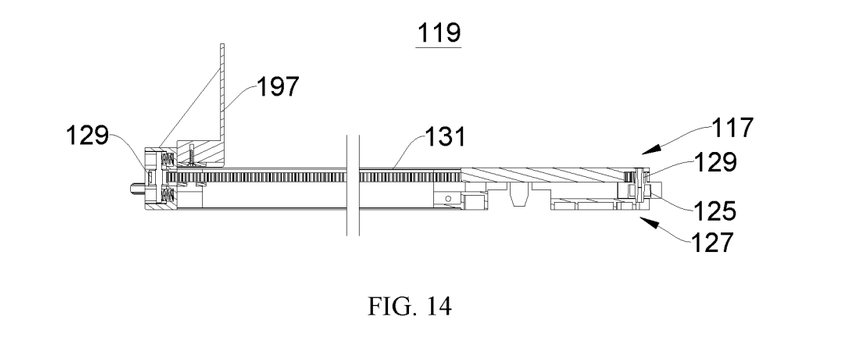
FIG. 14 is a local section view of a dispensing mechanism of a vending machine according to an embodiment of the application.
Figure 15:
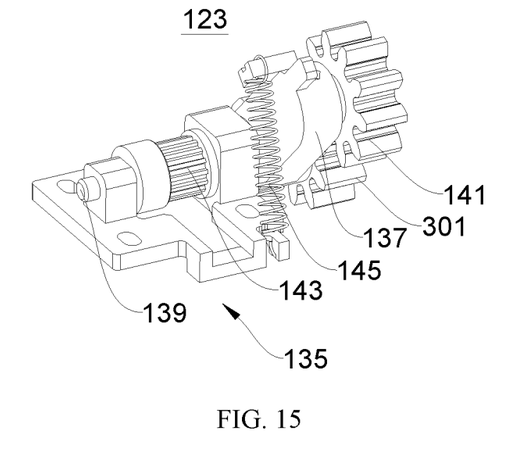
FIG. 15 is a structural view of a third driving mechanism of a vending machine according to an embodiment of the application.

FIG. 9 is a structural view of a dispensing mechanism 119 cooperating with a bucket 107 of a vending machine 100 according to an embodiment of the application; FIG. 10 is a structural view of a dispensing mechanism 119 of a vending machine 100 according to the embodiment from a fifth angle of view; FIG. 11 is a structural view of a dispensing mechanism 119 of a vending machine 100 according to the embodiment from a sixth angle of view; FIG. 12 is a local structural view of a dispensing mechanism 119 of a vending machine 100 according to the embodiment from a seventh angle of view; FIG. 13 is a local structural view of a dispensing mechanism 119 of a vending machine 100 according to the embodiment from an eighth angle of view; FIG. 14 is a local section view of a dispensing mechanism 119 of a vending machine 100 according to the embodiment; FIG. 15 is a structural view of a third driving mechanism 123 according to the embodiment; Please refer to FIG. 4 to FIG. 15, and in this embodiment, a transmission mechanism is set at the bottom of the dispensing mechanism 119, and the transmission mechanism is in transmission connection with the dispensing mechanism 119. The transmission mechanism is used to drive the dispensing mechanism 119 to move in the direction of item dispensing and then dispenses the item. The bucket 107 is further provided with a third driving mechanism 123. The third driving mechanism 123 may be in a third position in cooperation with the transmission mechanism and in a fourth position separated from the transmission mechanism. When the bucket 107 moves to be opposite to the storage column 193 for discharging and the third driving mechanism 123 is in the third position, the third driving mechanism 123 is configured to drive the transmission mechanism to drive the dispensing mechanism 119 to deliver the item in the storage column 193. The transmission mechanism is arranged at the bottom of the dispensing mechanism 119, which can make full use of the space in the cabinet body 101 and reduce the transverse width of the storage column 193 and save the transverse space of the storage column 193, thereby increasing the installation number of the transverse storage column 193 of the storage device 105, thus increasing the item storage capacity of the vending machine 100.

Please refer to FIG. 9 to FIG. 15. Specifically, in this embodiment, the dispensing mechanism 119 includes a push plate 197. The width of the push plate 197 is adapted to the width of the storage column 193 for pushing out the item. The transmission mechanism includes a second gear 125 and a third transmission assembly 127 that are in transmission connection, the third transmission assembly 127 is in transmission connection with the push plate 197, and the second gear 125 can be in transmission connection with the third driving mechanism 123. The third driving mechanism 123 can drive the second gear 125 to rotate, thus the third transmission assembly 127 is capable of moving and driving the push plate 197 to move, and thus the item in storage column 193 may be pushed out.

In some embodiments, the third transmission assembly 127 includes two belt wheels 129 arranged at intervals at the bottom of the storage column 193 in the direction of item dispensing and a first driving belt 131 supported by the two belt wheels 129. The belt wheel 129 arranged near the item outlet 117 are coaxially and fixedly connected with the second gear 125, and the first driving belt 131 is fixedly connected with the push plate 197. During dispensing, the third driving mechanism 123 is capable of driving the second gear 125 to rotate, thus the belt wheel 129 rotates to drive the first driving belt 131 to move, thus driving the push plate 197 to dispense the item.

In some embodiments, the dispensing mechanism 119 further includes a support frame 199 for supporting item. The support frame 199 is located at the bottom of the storage column 193 and is provided with a groove 147 extending in the direction of item dispensing. The push plate 197 is located above the support frame 199, the third transmission assembly 127 is located in the support frame 199, the two belt wheels 129 are arranged at intervals in the support frame 199, and the push plate 197 is fixedly connected to the first driving belt 131 through the groove 147.

On the one hand, the groove 147 can realize a good guiding function, so that the movement trace of the push plate 197 is more accurate and the deviation of the item during the pushing operation is avoided. On the other hand, the arrangement of the groove 147 allows the push plate 197 to be connected with the first driving belt 131 up and down through the groove 147 on the support frame 199, which is convenient to arrange the transmission mechanism at the bottom of the support frame 199, thereby reducing the thickness of the sidewalls of the storage column 193, thus the storage device 105 may be arranged with more storage column 193 in the lateral direction, making full use of the space in the cabinet body 101.

In some embodiments, one end of the support frame 199 adjacent to the item outlet 117 is further provided with an elastic hook 185, and a fixed hole is arranged in the corresponding position on the shelf 111, and the elastic hook 185 is used for clamping with the fixed hole, thus ensuring the stability of the support frame 199 after installation, and further ensuring the stable delivery of the item. It should be noted that, in this embodiment, the number of the elastic hook 185 is two, which are arranged on opposite sides of the support frame 199. In other embodiments herein, the number of the elastic hook 185 may be set according to the requirements.

In some embodiments, one end of the support frame 199 adjacent to the inlet 211 is further provided with an insertion post 187, and the rear end of the shelf 111 is provided with a back plate, and a locating slot is provided on the back plate. The insertion post 187 is used for connecting with the locating slot, so as to ensure the stability of the support frame 199 after installation, thus ensuring the stable delivery of the item. It should be noted that the back plate can further be provided with the insertion post 187, and the end of the support frame 199 away from the inlet 211 can further be provided with a long slot 189. The long slot 189 is matched with the insertion post 187 of the back plate to further improve the stability of the support frame 199.

In some embodiments, the third driving mechanism 123 is arranged on the bucket 107 and includes a second motor 133 and a connecting piece in transmission connection with the second motor 133. When the bucket 107 is opposite to the storage column 193 for discharging, and the second motor 133 rotates in a third rotation direction, the connecting piece can cooperate with the transmission mechanism to drive the push plate 197 to push out the item in the storage column 193. When the second motor 133 rotates in a fourth rotation direction, the connecting piece is separated from the transmission mechanism. The third rotation direction is opposite to the fourth rotation direction.

In some embodiments, as shown in FIG. 4 and FIG. 15, the third driving mechanism 123 further includes a fourth transmission assembly 135 and a spring 145, and the connecting piece is in transmission connection with the second motor 133 through the fourth transmission assembly 135. In this embodiment, both the connecting piece and the fourth transmission assembly 135 are arranged below the inlet 211 of the bucket 107 and located on one side of the bucket 107 adjacent to the storage device 105. In some embodiments, the connecting piece is located on the centerline of the width of the inlet 211, and the transmission mechanism of the dispensing mechanism 119 in each storage column 193 is located at the width center of the storage column 193. Therefore, the connection of the push plate 197 and the first driving belt 131 of the dispensing mechanism 119 is adjacent to or located at the width center of the push plate 197. With such arrangement, the driving force applied to the push plate 197 is located at or adjacent to the width center of the push plate 197, which the push plate 197 can move more smoothly and facilitate pushing out the item in the storage column 193.

In some embodiments, the fourth transmission assembly 135 includes a mounting bracket, a driving belt wheel 457, a second driving belt 195 and a driven belt wheel 143. The mounting bracket is fixedly connected to the shell 209, the driving belt wheel 457 is fixedly sleeved on the output shaft of the second motor 133, the driven belt wheel 143 is arranged on the mounting bracket, and the second driving belt 195 is supported by the driving belt wheel 457 and the driven belt wheel 143.

In some embodiments, the connecting piece is arranged on the mounting bracket and is in transmission connection with the second motor 133 through a fourth transmission assembly 135. Specifically, the connecting piece includes a swing arm 137, a mandrel 139, a third gear 141, a fourth gear 301 and a one-way bearing (not shown in the Figure), the mandrel 139 is supported by the mounting bracket and can rotate around its own axis. The driven belt wheel 143, the swing arm 137 and the fourth gear 301 are sequentially sleeved on the mandrel 139 along the length direction of the mandrel 139, the driven belt wheel 143 and the fourth gear 301 are fixedly connected with the mandrel 139, while the one-way bearing is sleeved on the mandrel 139 and inserted with the swing arm 137, and the third gear 141 is arranged on the swing arm 137 and engaged with the fourth gear 301. When the mandrel 139 rotates in the forward direction, the one-way bearing slips relative to the mandrel 139 and cannot drive the swing arm 137 to rotate with it. When the mandrel 139 rotates in the reverse direction, the one-way bearing clamps the mandrel 139 and drives the swing arm 137 to rotate in the reverse direction.

In some embodiments, the spring 145 is connected between the swing arm 137 and the mounting bracket, and the spring 145 is configured to make the swing arm 137 have a moving tendency to rotate in the forward direction.

In some embodiments, the output shaft of the second motor 133 has the third rotation direction and the fourth rotation direction. When the bucket 107 moves to be opposite to the storage column 193 for discharging, the output shaft of the second motor 133 rotates in the third rotation direction, and the mandrel 139 is driven by the fourth transmission assembly 135 to rotate in the forward direction. The one-way bearing slips relative to the mandrel 139 and cannot drive the swing arm 137 to rotate, while the swing arm 137 rotates in the forward direction under the action of the spring 145 and swings toward the storage column 193 until the third gear 141 engages with the second gear 125 on the storage column 193, thus the third driving mechanism 123 is in the third position. At this time, as the third gear 141 engages with the fourth gear 301, the fourth gear 301 is fixedly sleeved on the mandrel 139, and the mandrel 139 rotating in the forward direction can drive the second gear 125 on the storage column 193 to rotate through the fourth gear 301 and the third gear 141, thus driving the push plate 197 to push out the item in the storage column 193. When the item in the storage column 193 is pushed out by the push plate 197 and falls into the bucket 107, the output shaft of the second motor 133 rotates in the fourth rotation direction, and the power of the second motor 133 drives the mandrel 139 to rotate in the reverse direction through the fourth transmission assembly 135, the one-way bearing clamps the mandrel 139 and drives the swing arm 137 to rotate in the reverse direction, and the swing arm 137 drives the third gear 141 to separate from the second gear 125 on the storage column 193, thus the third driving mechanism 123 is in the fourth position. In this embodiment, the third driving mechanism 123 is switched between the third position and the fourth position through the cooperation between the second motor 133 and the one-way bearing and the spring 145. In addition, the power of the second motor 133 is also transmitted to the push plate 197 of the storage column 193, enabling the push plate 197 to realize the function of pushing item with a simple structure and a low cost.

Optionally, in this embodiment, as shown in FIG. 4, FIG. 12 and FIG. 13, a distance measuring element 149 is arranged on one side of the bucket 107 adjacent to the storage device 105, and a distance measuring part 151 in cooperation with the distance measuring element 149 is arranged at the bottom of the push plate 197 of each storage column 193. When the bucket 107 opposites to the storage column 193, the distance measuring element 149 opposites to the distance measuring part 151 in the storage column 193 to measure the distance between the push plate 197 and the bucket 107. The arrangement of the distance measuring element 149 enables the distance between the push plate 197 and the bucket 107 to be calculable, thus the remaining quantity of the item in the storage column 193 can be calculated according to the size of a single item, thereby ensuring the normal dispensing operation. The distance measuring element 149 may be a distance measuring sensor such as a laser sensor, an ultrasonic sensor, and an infrared sensor, or the like.

In some embodiments, the dispensing mechanism 119 further includes a plug-in 153 and a fixed part 155 arranged at the bottom of the push plate 197, and the plug-in 153 is inserted with the fixed part 155 to fixedly connect the first driving belt 131. The distance measuring part 151 is arranged on the fixed part 155, and an opening 157 opposite to the distance measuring part 151 is arranged at the bottom of the storage column 193, and the distance measuring element 149 cooperates with the distance measuring part 151 through the opening 157. With the cooperation between the distance measuring element 149 and the distance measuring part 151, the distance between the distance measuring part 151 and the bucket 107 can be measured, thus the storage length of the item in the storage column 193 is known, and the quantity of the item in the storage column 193 can be accordingly calculated, which can effectively improve the accuracy of the detection of the quantity of the item in the vending machine 100 and also can effectively help solve the technical problem of inaccurate detection of the quantity of the item in the storage column 193 of the vending machine 100. At the same time, it should be noted that in this embodiment, the distance measuring part 151 may be a reflecting surface and the distance measuring element 149 may be a laser sensor. The laser sensor sends a signal, and the signal is reflected on the reflecting surface and returns to the laser sensor, thus the quantity of the item within this distance can be calculated.

Optionally, in this embodiment, as shown in FIG. 4 and FIG. 12, the bucket 107 further includes a code scanning element 159, and one end of each storage column 193 adjacent to the item outlet 117 is further provided with a storage column sign 161. The storage column sign 161 contains such information as the name, kind, price, size and position of the storage column 193. When the bucket 107 is opposite to the storage column 193, the code scanning element 159 is opposite to the storage column sign 161, and the code scanning element 159 scans the contents of the storage column sign 161. The cooperation between the code scanning element 159 and the storage column sign 161 makes it possible to identify the item information and position information of the storage column 193, thus facilitating the search for the correct target storage column 193 and improving the accuracy of dispensing.

Figure 16:
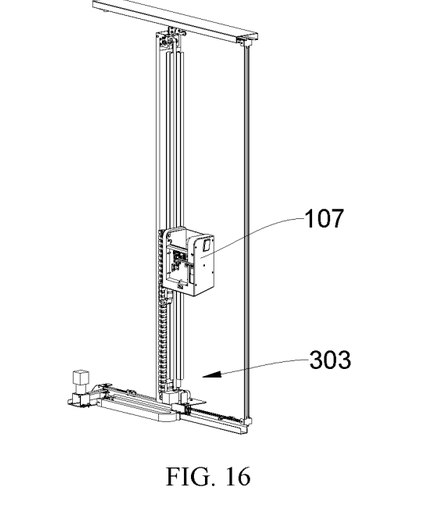
FIG. 16 is a structural view of a bucket and a bucket driving device according to an embodiment of the application.

FIG. 16 is a structural view of a bucket 107 and a bucket driving device 303 according to this embodiment. Please refer to FIG. 1, FIG. 2 and FIG. 16, in this embodiment, the bucket 107 is arranged between the cabinet door 103 and the storage device 105, and a bucket driving device 303 is in transmission connection with the bucket 107, and the bucket driving device 303 is arranged in the cabinet body 101 between the cabinet door 103 and the storage device 105. The bucket driving device 303 is configured to drive the bucket 107 to move in the up and down direction and/or the left and right direction, enabling the inlet 211 of the bucket 107 to be opposite to the item outlet 117 of any storage column 193 for dispensing, or enabling the outlet 223 of the bucket 107 to be opposite to the pickup port 407. When the inlet 211 of the bucket 107 is opposite to the item outlet 117 of any storage column 193 for discharging, the item in the storage column 193 may be delivered into the bucket 107. When the outlet 223 of the bucket 107 is opposite to the pickup port 407, the bucket 107 can deliver the item to the pickup port 407, and the user may take away the item in the pickup port 407.

Figure 17:
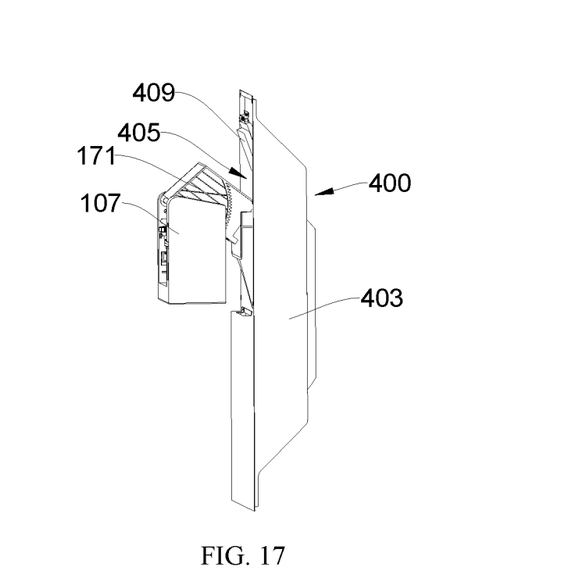
FIG. 17 is a local structural view of a bucket cooperating with a dispensing device of a vending machine according to an embodiment of the application.
Figure 18:
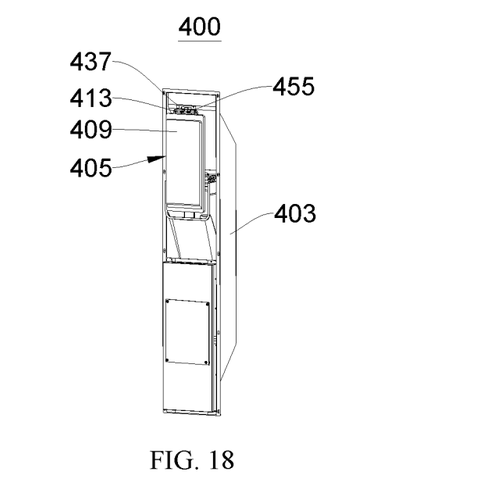
FIG. 18 is a structural view of a dispensing device of a vending machine according to an embodiment of the application.

FIG. 17 is a local structural view of the cooperation between the bucket 107 and the dispensing device 400 of the vending machine 100 according to an embodiment of the application, and FIG. 18 is a structural view of the dispensing device 400 of the vending machine 100 according to an embodiment of the application. Please refer to FIG. 1, FIG. 2, FIG. 17 and FIG. 18, in this embodiment, the vending machine 100 further includes a dispensing device 400. The dispensing device 400 is arranged at the pickup port 407 and includes a housing 403.

In some embodiments, the housing 403 has an inner opening 405 and an outer opening, the inner opening 405 connects with the interior of the cabinet 102 and the outer opening connects with the pickup port 407. When the bucket 107 moves to be opposite to the pickup port 407, the first driving mechanism 167 drives the turnover body 171 to rotate to the second position, and the outlet 223 of the turnover body 171 deviates from the base plate 300 and opposites to and connected with the inner opening 405, and the item in the turnover body 171 may fall into the housing 403 through the inner opening 405.

In some embodiments, the dispensing device 400 further includes an entrance gate 409. The entrance gate 409 is arranged at the inner opening 405 and used for closing or opening the inner opening 405.

Please refer to FIG. 18 once again, in this embodiment, the entrance gate 409 is mobile connected with the housing 403 through a gate rotating shaft 413. Specifically, the housing 403 is arranged with a fixed frame 437, and the gate rotating shaft 413 is arranged on the fixed frame 437. The entrance gate 409 is provided with an elastic piece 455, and the elastic piece 455 is configured to make the entrance gate 409 to have a tendency to close the inner opening 405. The arrangement of the elastic piece 455 makes the entrance gate 409 have a tendency to close the inner opening 405, so as to ensure the isolation of the internal and external environment of the dispensing device 400 and further isolate the internal and external environment of the vending machine 100.

When the bucket 107 moves to be opposite to the pickup port 407, if the turnover body 171 is located in the first position and the base plate 300 closes the outlet 223, at this time, the turnover body 171 has no contact with the entrance gate 409, and the entrance gate 409 closes the inner opening 405 under the action of the elastic piece 455, and the item cannot be dispensed. When the turnover body 171 is located in the second position, the outlet 223 deviates from the base plate 300 and the outlet 223 is opened, thus the rotating turnover body 171 abuts the entrance gate 409, driving the entrance gate 409 to open the inner opening 405, thus the item in the turnover body 171 enters the housing 403 through the inner opening 405, waiting for the user to take the item from the pickup port 407.

To sum up, the bucket 107 according to this embodiment of the application can selectively block or open the connection between the outlet 223 and the outside, thus improving the safety of the bucket 107, isolating the internal and external environment of the vending machine 100, and reducing the energy consumption of the vending machine 100.

An embodiment of the application provides a bucket, including a shell, a turnover body and a first driving mechanism. The shell is provided with a base plate for supporting item. The turnover body is moveably arranged in the shell and is provided with a storage cavity for holding the item, an inlet for receiving the item and an outlet for discharging the item, both the inlet and the outlet are connected with the storage cavity, and the turnover body may be located in the first position and the second position. When the turnover body is located in the first position, the base plate closes the outlet; when the turnover body is located in the second position, the outlet deviates from the base plate and is opened; the first driving mechanism is in transmission connection with the turnover body and used for driving the turnover body to switch between the first position and the second position. With the arrangement of the turnover body, the connection between the outlet of the bucket and the outside may be selectively blocked or opened, thus improving the safety of the item in the bucket and the sealing of the internal and external environment of the bucket.

An embodiment of the application further provides a vending machine including the above-mentioned bucket. Therefore, the vending machine has a high safety performance, and the internal and external environments are isolated, and the energy consumption is low.

What is claimed is:

1. A bucket, comprising:
   a shell, which is provided with a base plate;
   a turnover body moveably arranged in the shell, is provided with a storage cavity, an inlet and an outlet, both of the inlet and the outlet are connected with the storage cavity, and the turnover body is capable of being located in a first position and a second position; the base plate is configured to, when the turnover body is located in the first position, close the outlet, and the outlet is configured to, when the turnover body is located in the second position, deviate from the base plate and be opened; and
   a first driving mechanism in transmission connection with the turnover body, is configured to drive the turnover body to switch between the first position and the second position,
   wherein the turnover body is rotatably connected with the shell and the first driving mechanism comprises a first motor and a first transmission assembly, and the first transmission assembly is in transmission connection with the first motor and the turnover body;
   wherein the first transmission assembly comprises an arc rack and a first gear engaged with the arc rack; the first motor is arranged in the shell and the first gear is in transmission connection with the first motor; the arc rack is arranged on a sidewall of the turnover body and is concentric with a rotating shaft of the turnover body.

2. The bucket according to claim 1, wherein,
   the turnover body has a tubular structure with openings at the top and bottom respectively, an upper opening of the turnover body is the inlet, and a lower opening of the turnover body is the outlet.

3. The bucket according to claim 1, wherein,
   the output shaft of the first motor is provided with a first rotation direction and a second rotation direction; the first transmission assembly comprises a first one-way member, and the first one-way member is configured to transmit power to the turnover body only when the output shaft of the first motor rotates in the first rotation direction, so as to drive the turnover body to rotate toward the second position.

4. The bucket according to claim 3, further comprising a delivery mechanism and a second driving mechanism, wherein the delivery mechanism comprises a delivery roller, and the delivery roller is arranged on the shell and adjacent to the inlet; the second driving mechanism comprises a second transmission assembly, and the second transmission assembly is in transmission connection with the first motor and the delivery roller simultaneously, and the second transmission assembly is configured to transmit the power of the first motor to the delivery roller, so as to enable the delivery roller to deliver the item into the inlet.

5. The bucket according to claim 1, wherein a locating plate is fixedly sleeved on the rotating shaft, and a first detecting member is further arranged on the shell, and the first detecting member is configured to detect the position of the locating plate.

6. The bucket according to claim 1, wherein,
   the first driving mechanism further comprises an elastic element connected between the turnover body and the shell, and the elastic element is configured to enable the turnover body to have a tendency to move toward the first position.

7. The bucket according to claim 1,
   further comprising a delivery mechanism and a second driving mechanism, wherein the delivery mechanism comprises a delivery roller, and the delivery roller is arranged on the shell and adjacent to the inlet; the second driving mechanism comprises a second transmission assembly, and the second transmission assembly is in transmission connection with the first motor and the delivery roller simultaneously, and the second transmission assembly is configured to transmit the power of the first motor to the delivery roller, so as to enable the delivery roller to deliver the item into the inlet.

8. The bucket according to claim 7, wherein,
   the second transmission assembly comprises a second one-way member, the output shaft of the first motor is provided with a first rotation direction and a second rotation direction, and the second one-way member is configured to transmit power to the delivery roller only when the output shaft of the first motor rotates in the second rotation direction, so as to drive the delivery roller to deliver item into the inlet.

9. The bucket according to claim 7, wherein,
   the delivery mechanism further comprises a driven roller and a conveyor belt, which the delivery roller and the driven roller are arranged at intervals along the direction in which the item enters the inlet, and the conveyor belt is supported by the delivery roller and the driven roller.

10. A vending machine, comprising:
    a cabinet, a storage device arranged in the cabinet, and a bucket, wherein the bucket comprises:
    a shell, which is provided with a base plate;
    a turnover body moveably arranged in the shell, is provided with a storage cavity, an inlet and an outlet, both of the inlet and the outlet are connected with the storage cavity, and the turnover body is capable of being located in a first position and a second position; the base plate is configured to, when the turnover body is located in the first position, close the outlet, and the outlet is configured to, when the turnover body is located in the second position, deviate from the base plate and be opened; and a first driving mechanism in transmission connection with the turnover body, is configured to drive the turnover body to switch between the first position and the second position, wherein the turnover body is rotatably connected with the shell and the first driving mechanism comprises a first motor and a first transmission assembly, and the first transmission assembly is in transmission connection with the first motor and the turnover body;

wherein the first transmission assembly comprises an arc rack and a first gear engaged with the arc rack; the first motor is arranged in the shell and the first gear is in transmission connection with the first motor; the arc rack is arranged on a sidewall of the turnover body and is concentric with a rotating shaft of the turnover body;

wherein a surface of the cabinet is provided with a pickup port, and the storage device comprises a storage column, and the bucket is configured to deliver item between the storage column and the pickup port.

11. The vending machine according to claim 10, wherein, the turnover body has a tubular structure with openings at the top and bottom respectively, an upper opening of the turnover body is the inlet, and a lower opening of the turnover body is the outlet.

12. The vending machine according to claim 10, wherein the storage column is provided with a dispensing mechanism;

the bottom of the dispensing mechanism is provided with a transmission mechanism, and the transmission mechanism is in transmission connection with the dispensing mechanism;

a third driving mechanism is arranged on the bucket, and the third driving mechanism is capable of being located in a third position in cooperation with the transmission mechanism and a fourth position separated from the transmission mechanism; when the third driving mechanism is located in the third position, the third driving mechanism is configured to drive the transmission mechanism the dispensing mechanism to dispense the item in the storage column.

13. The vending machine according to claim 12, wherein the dispensing mechanism comprises a push plate;

the transmission mechanism comprises a second gear and a third transmission assembly that are in transmission connection, the third transmission assembly is in transmission connection with the push plate, and the second gear can be in transmission connection with the third driving mechanism;

the third driving mechanism is configured to drive the second gear to rotate, so as to drive the push plate to move through the third transmission assembly.

14. The vending machine according to claim 13, wherein the dispensing mechanism further comprises a support frame, and the support frame is provided with a groove extending in the direction of item dispensing, the push plate is located above the support frame, and the third transmission assembly is located inside the support frame;

the third transmission assembly comprises two belt wheels arranged at intervals in the support frame in the direction of item dispensing and a first driving belt supported by the two belt wheels, the second gear is coaxially and fixedly connected with one of the two belt wheels, and the push plate is fixedly connected with the first driving belt through the groove.

15. The vending machine according to claim 10, wherein a locating plate is fixedly sleeved on the rotating shaft, and a first detecting member is further arranged on the shell, and the first detecting member is configured to detect the position of the locating plate.

16. The vending machine according to claim 10, wherein, the output shaft of the first motor is provided with a first rotation direction and a second rotation direction; the first transmission assembly comprises a first one-way member, and the first one-way member is configured to transmit power to the turnover body only when the output shaft of the first motor rotates in the first rotation direction, so as to drive the turnover body to rotate toward the second position.

17. A bucket, comprising:

a shell, which is provided with a base plate;

a turnover body moveably arranged in the shell, is provided with a storage cavity, an inlet and an outlet, both of the inlet and the outlet are connected with the storage cavity, and the turnover body is capable of being located in a first position and a second position; the base plate is configured to, when the turnover body is located in the first position, close the outlet, and the outlet is configured to, when the turnover body is located in the second position, deviate from the base plate and be opened; and a first driving mechanism in transmission connection with the turnover body, is configured to drive the turnover body to switch between the first position and the second position, wherein the turnover body is rotatably connected with the shell and the first driving mechanism comprises a first motor and a first transmission assembly, and the first transmission assembly is in transmission connection with the first motor and the turnover body;

wherein the output shaft of the first motor is provided with a first rotation direction and a second rotation direction; the first transmission assembly comprises a first one-way member, and the first one-way member is configured to transmit power to the turnover body only when the output shaft of the first motor rotates in the first rotation direction, so as to drive the turnover body to rotate toward the second position.

* * * * *